US 10,428,880 B2

(12) United States Patent
Trinkenschuh et al.

(10) Patent No.: US 10,428,880 B2
(45) Date of Patent: Oct. 1, 2019

(54) CLUTCH SYSTEM

(71) Applicant: Schaeffler Technologies AG & Co. KG, Herzogenaurach (DE)

(72) Inventors: Andreas Trinkenschuh, Bühl (DE); Dierk Reitz, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 43 days.

(21) Appl. No.: 15/567,044

(22) PCT Filed: Mar. 15, 2016

(86) PCT No.: PCT/DE2016/200141
§ 371 (c)(1),
(2) Date: Oct. 16, 2017

(87) PCT Pub. No.: WO2016/165701
PCT Pub. Date: Oct. 20, 2016

(65) Prior Publication Data
US 2018/0087583 A1    Mar. 29, 2018

(30) Foreign Application Priority Data

| Apr. 17, 2015 | (DE) | ........................ | 10 2015 207 039 |
| Apr. 17, 2015 | (DE) | ........................ | 10 2015 207 041 |
| May 28, 2015 | (DE) | ........................ | 10 2015 209 791 |

(51) Int. Cl.
*F16D 27/112* (2006.01)
*F16D 13/52* (2006.01)
(Continued)

(52) U.S. Cl.
CPC ............ *F16D 27/112* (2013.01); *F16D 13/52* (2013.01); *F16D 13/54* (2013.01); *F16D 41/04* (2013.01);
(Continued)

(58) Field of Classification Search
None
See application file for complete search history.

(56) References Cited

U.S. PATENT DOCUMENTS 5,485,904 A * 1/1996 Organek ................. F16D 23/12
192/35
5,810,141 A * 9/1998 Organek ................. F16D 13/04
192/35
(Continued)

FOREIGN PATENT DOCUMENTS

| CN | 102869529 A | 1/2013 |
| CN | 103987983 A | 8/2014 |
(Continued)

OTHER PUBLICATIONS

International Search Report for PCT/DE2016/200141; 3 pgs; dated Aug. 5, 2016 by European Patent Office.

*Primary Examiner* — Mark A Manley
(74) *Attorney, Agent, or Firm* — LeKeisha M. Suggs

(57) ABSTRACT

A clutch system includes a friction clutch and a ramp system. The friction clutch is a multiplate clutch, for example, for transmitting a torque between a torque-introducing element (i.e., an engine drive shaft) and a torque-discharging element (i.e., a transmission input shaft). The ramp system includes an input ramp, an output ramp, a pilot clutch, an actuation element, and a freewheel. The output ramp is rotatable relative to the input ramp to change an axial extent of the ramp system. The pilot clutch is for initiating rotation of the input ramp relative to the output ramp when there is a differential speed between the torque-introducing element and the torque-discharging element. The actuation element is for actuating the pilot clutch. The freewheel is arranged in a torque path in parallel with the friction clutch, and arranged to transmit a torque flow from the torque-introducing element to the torque-discharging (Continued)

element and interrupt a torque flow from the torque-discharging element to the torque-introducing element.

20 Claims, 3 Drawing Sheets

(51) Int. Cl.
    *F16D 13/54*     (2006.01)
    *F16D 41/04*     (2006.01)
    *F16D 47/04*     (2006.01)
    *F16D 27/115*     (2006.01)
    *B60K 6/383*     (2007.10)
    *F16D 23/12*     (2006.01)

(52) U.S. Cl.
    CPC .............. *F16D 47/04* (2013.01); *B60K 6/383* (2013.01); *F16D 27/115* (2013.01); *F16D 2023/123* (2013.01)

(56) References Cited

U.S. PATENT DOCUMENTS

| | | | |
|---|---|---|---|
| 5,910,061 A * | 6/1999 | Organek | ............... F16D 27/112 |
| | | | 475/149 |
| 6,343,681 B1 | 2/2002 | Aoki | |
| 9,518,622 B2 * | 12/2016 | Vogel | ........................ B60L 7/28 |
| 2002/0166744 A1 | 11/2002 | Nojiri et al. | |
| 2018/0135707 A1 * | 5/2018 | Trinkenschuh | ......... F16D 13/52 |

FOREIGN PATENT DOCUMENTS

| | | |
|---|---|---|
| CN | 103998811 A | 8/2014 |
| DE | 102014213486 A1 | 1/2015 |
| DE | 102014225961 A1 | 6/2015 |
| EP | 0669480 A1 | 8/1995 |
| WO | 2011050773 A1 | 5/2011 |
| WO | 2013186101 A1 | 12/2013 |

\* cited by examiner

CLUTCH SYSTEM

CROSS-REFERENCE TO RELATED APPLICATIONS

This application is the United States National Phase of PCT Appln. No. PCT/DE2016/200141 filed Mar. 15, 2016, which claims priority to German Application Nos. DE102015207041.7 filed Apr. 17, 2015, DE102015207039.5 filed Apr. 17, 2015, and DE102015209791.9 filed May 28, 2015, the entire disclosures of which are incorporated by reference herein.

TECHNICAL FIELD

The present disclosure relates to a clutch system, with the aid of which a drive shaft of a motor vehicle engine can be coupled to at least one transmission input shaft of a motor vehicle transmission, for example, in a hybrid motor vehicle.

BACKGROUND

WO 2011/050773 A1 discloses a clutch system in the form of a "booster clutch", in which a friction clutch designed as a separating clutch can be actuated with the aid of a ramp system. To close the friction clutch, the ramp system can change its axial extent by means of an output ramp, which can be rotated relative to an input ramp, and can thereby axially move a pressure plate of the friction clutch. It is thereby possible for a clutch disk to be clamped frictionally between the pressure plate and a counterplate of the friction clutch.

There is a need to be able to adapt torque transmission in a powertrain, for example, that of a hybrid motor vehicle, easily and efficiently to different driving strategies.

Thus there is a long-felt need to indicate measures which enable easy and efficient adaptation of torque transmission in a powertrain, for example, that of a hybrid motor vehicle, to different driving strategies.

BRIEF SUMMARY

The present disclosure discloses a clutch system for coupling a drive shaft of a motor vehicle engine to at least one transmission input shaft of a motor vehicle transmission. The clutch system has a friction clutch, a ramp system, a pilot clutch, an actuation element, and a freewheel. In an example embodiment, a friction clutch is designed as a multiplate clutch for transmitting a torque between a torque-introducing element, for example, a drive shaft of the motor vehicle engine, and a torque-discharging element, for example, a transmission input shaft of the motor vehicle transmission. The ramp system is for the axial movement of a pressure plate of the friction clutch. The ramp system has an input ramp and an output ramp. The output ramp can be rotated relative to the input ramp to change an axial extent of the ramp system. The pilot clutch is for initiating rotation of the input ramp relative to the output ramp owing to a differential speed between the torque-introducing element and the torque-discharging element. The actuation element is for actuating the pilot clutch. The freewheel is connected in parallel with the friction clutch for transmitting a torque from the torque-introducing element to the torque-discharging element and for interrupting a torque flow from the torque-discharging element to the torque-introducing element.

In a regular traction mode, a torque flow can take place from the torque-introducing element to the torque-discharging element substantially via the freewheel. As a result, a torque produced in a motor vehicle engine designed as an internal combustion engine, for example, can be transmitted to a transmission input shaft of a motor vehicle transmission in order to drive the motor vehicle. Since, with this driving strategy, the torque-introducing element overtakes the torque-discharging element, the freewheel is continuously in the locking position thereof and transmits the torque.

In an overrun mode, the torque-discharging element can overtake the torque-introducing element, as a result of which the freewheel moves into its freewheeling position and cannot transmit any torque in the direction of overrun. As a result, torque transmission can take place only via the friction clutch in the overrun mode. When the pilot clutch is closed, the input ramp of the ramp system is coupled to the torque-introducing element and the output ramp is coupled to the torque-discharging element, resulting in a speed difference between the input ramp and the output ramp, which leads to rotation of the input ramp relative to the output ramp. The axial extent of the ramp system can thereby be increased, as a result of which the friction clutch, which, for example, is designed as a separating clutch, is closed and a torque flow can take place from the torque-discharging element to the torque-introducing element. As a result, a torque flow can take place from the transmission input shaft to the motor vehicle engine in the overrun mode, e.g. in order to be able to make available an additional braking capacity for braking the motor vehicle with the aid of the mass moment of inertia of the motor vehicle engine.

When the pilot clutch is open, the input ramp is decoupled from the torque-introducing element and is no longer supported on the torque-introducing element. In this case, there is no speed difference between the input ramp and the output ramp, and the friction clutch is open. Torque flow from the transmission input shaft to the motor vehicle engine can thereby be prevented in the overrun mode, e.g. in order to allow the motor vehicle to freewheel without unnecessary drag losses due to the mass moment of inertia of the motor vehicle engine in a coasting mode. In the case of a hybrid motor vehicle, an electric machine can furthermore easily drive the motor vehicle in the motor mode in this situation without having to accept unnecessary drag losses due to the mass moment of inertia of the motor vehicle engine. For the changeover of operating modes in the overrun mode, all that is required is to use the pilot clutch to briefly exploit an existing speed difference between the torque-introducing element and the torque-discharging element to actuate the friction clutch, thus allowing easy and efficient adaptation of torque transmission in a powertrain of a hybrid motor vehicle, for example, to different driving strategies.

The pilot clutch, the ramp system and the friction clutch can together form a "booster clutch". In the closed state of the friction clutch, the torque-introducing element and the torque-discharging element have substantially the same speed in slip-free operation. In the open state of the friction clutch, the torque-introducing element and the torque-discharging element can rotate at different speeds, with the result that a speed difference arises between the torque-introducing element and the torque-discharging element. The torque flowing via the torque-introducing element and the friction clutch can flow at least partially via the at least partially closed pilot clutch, allowing torque transmission at least temporarily via the ramp system in the closed state of the pilot clutch, thereby making it possible to reduce component loads. In an example embodiment, the pilot clutch brings about slip-free frictional engagement between the torque-introducing element and the torque-discharging element when the input ramp is rotated relative to the output ramp. By means of the slip-free frictional engagement, it is possible to produce in the pilot clutch a speed difference which can be used to rotate the input ramp relative to the output ramp. At the same time, it is also possible in the slipping mode to transmit a torque, which can be passed to the ramp system in order to provide a correspondingly high contact force for the pressure plate. Before speed equalization between the torque-introducing element and the torque-discharging element has occurred, the slipping pilot clutch can convert the speed difference into a rotation of the input ramp relative to the output ramp by means of suitable coupling of the ramp system to the pilot clutch. It is thereby possible to change the axial extent of the ramp system by virtue of the speed difference within the pilot clutch and thus by virtue of the speed difference between the torque-introducing element and the torque-discharging element. By means of the changing extent of the ramp system, the pressure plate can be moved in order to close the friction clutch, wherein a movement force for moving the pressure plate can be derived from the torque transmitted via the pilot clutch. Once the extent of the ramp system has changed to the extent that, for example, the pressure plate clamps a clutch disk and/or plates of a multiplate clutch, ending of the slipping mode is followed by synchronization of the speeds of the torque-introducing element and of the torque-discharging element, with the result that there is no longer speed difference. The ramp system can then remain in the position attained.

In the closed position of the friction clutch, the majority of the torque to be transmitted can flow via the friction pair comprising the counterplate and the clutch disk, wherein a smaller proportion of the torque to be transmitted can be transmitted via the pilot clutch. As a result, it is possible to exert a correspondingly high contact force on the pressure plate via the pilot clutch, thus enabling a correspondingly higher torque to be transmitted reliably and without slippage. Here, a force multiplication can be achieved through a suitable choice of ramp slope for the ramp system, thus making it possible to achieve an increased multiplied contact force with a low actuating force for the actuation of the pilot clutch. Moreover, some of the torque to be transmitted can be used to provide the contact force, and therefore the contact force can be supplied from an additional energy source. By virtue of the fact that the actuating force engages on the pressure plate only indirectly via the pilot clutch, force multiplication and/or torque derivation from the torque to be transmitted can be achieved by means of the pilot clutch in order to close the friction clutch, and therefore the friction clutch can be closed frictionally using a significantly increased contact force, thereby allowing reliable closure of the friction clutch with low design complexity.

By means of the ramp slope of the ramps of the ramp system, force multiplication can be achieved, with the result that the actuating force required to close the pilot clutch is significantly lower than the contact force which can be achieved at the pressure plate. As a result, an actuating system, for example, a magnetic actuating system, can be of significantly smaller and more space-saving dimensions than if the actuating system had to move the pressure plate directly. It is furthermore possible to move the pilot clutch out of the region of the pressure plate. It is thereby possible, especially in comparison with the pressure plate, to position the pilot clutch at least to a large extent radially on the inside relative to the pressure plate, thus allowing installation space radially on the inside relative to friction linings of the clutch disk to be used. It is thereby possible to provide the friction contacts of the clutch disk in a region which is relatively far out radially, and therefore a correspondingly short radially inward extent of the friction clutch is required to enable a correspondingly large friction surface to be achieved. Here, it is possible to make use of the insight that the pilot clutch need only transmit a low torque to actuate the ramp system, and therefore a correspondingly smaller friction surface over a mean friction radius which is smaller in comparison with the clutch disk is sufficient.

The output ramp can be coupled to the torque-discharging element in a manner which prevents relative rotation but allows axial movement. As a result, the output ramp, which is coupled to the torque-discharging element, and the input ramp, which can be coupled to the torque-introducing element by means of the pilot clutch, can be rotated relative to one another when there is a differential speed between the torque-discharging element and the torque-introducing element. The ramps of the ramp system can slide directly on one another or can be rotated relative to one another by way of at least one ball, a cylinder or some other rotatable element, thus enabling a ball-ramp system to be formed. By virtue of the rotation of the ramps relative to one another, the distance between the rear sides of the input ramp and output ramp facing away from the other, opposite ramp in each case can change, allowing the axial extent of the ramp system to decrease or increase accordingly. In an example embodiment, the maximum relative angle of rotation of the input ramp relative to the output ramp is limited by at least one stop, for example, thereby making it possible to avoid exceeding a maximum wear range of friction linings of the friction clutch, for example.

In an example embodiment, the freewheel has an input ring coupled to the torque-introducing element and an output ring coupled to the torque-discharging element, wherein, when closed, the pilot clutch is coupled frictionally to the input ring, for example, indirectly via an input plate carrier of the friction clutch. The input ring of the freewheel can thus represent a point in the torque flow at which power splitting of the torque can take place. It is thereby possible to ensure that the torque produced by the motor vehicle engine arrives substantially in full at the freewheel and is passed on to the torque-discharging element via the freewheel when in the traction mode. In the case of an overrun mode, when the freewheel is in the freewheeling position, the torque coming from the torque-discharging element can be transmitted to the input ring via the friction clutch, instead of via the output ring of the freewheel, if the pilot clutch has provided a torque flow to the torque-introducing element in the overrun mode. In the traction mode, the entire torque can be made to bypass the pilot clutch and the friction clutch while, in the overrun mode, the torque can be made to bypass the freewheel. The different load paths of the torque to be transmitted in the traction mode and in the overrun mode can thereby be kept very short, thereby making possible a clutch system design which saves installation space.

In an example embodiment, the freewheel has an input ring coupled to the torque-introducing element and an output ring coupled to the torque-discharging element. The output ring of the freewheel is connected to an output element of the friction clutch, said output element being designed, for example, as an output plate carrier. In an example embodiment, the output ring is connected to the output element via an axially fixed counterplate of the friction clutch. This makes it possible to feed the torque flow to the torque-discharging element directly at the output of the friction clutch in the traction mode, thus making it possible to use as many subsections as possible to jointly transmit torque in the traction mode and in the overrun mode. The different load paths of the torque to be transmitted in the traction mode and in the overrun mode can thereby be kept very short, thereby making possible a clutch system design which saves installation space.

In an example embodiment, an output element of the friction clutch and/or the torque-discharging element has/ have an integrated radial offset compensator, for example, a torque sensor. As a result, the opening and closing of the friction clutch by a speed difference present at the pilot clutch can take place more smoothly. Moreover, a relative rotation of involved component parts of the pilot clutch and of the friction clutch, which arises for actuation of the friction clutch, can be automatically compensated. In an example embodiment, a spring element can be preloaded by the effective torque in the radial offset compensator during the closure of the friction clutch, with the result that the preloaded spring element can automatically open the friction clutch when the applied torque disappears. A changeover between the overrun mode and the traction mode can thereby be achieved in a simple manner without the need for the action of an external control on the friction clutch or the pilot clutch.

In an example embodiment, the pilot clutch has a return spring for positioning the pilot clutch in a defined initial position corresponding, for example, to a closed position of the pilot clutch. The actuation element need only be actuated when torque transmission to the torque-introducing element and to the motor vehicle engine is to be interrupted in the overrun mode, e.g. when coasting or during purely electric driving of the motor vehicle with the aid of an electric machine of a hybrid motor vehicle acting on the torque-discharging element.

In an example embodiment, pilot clutch has a tie, which can be moved axially by the actuation element, for example, magnetically, for opening and/or closing the pilot clutch. By means of the tie, a friction element which can bring about frictional pairing for frictional coupling to the torque-introducing element can be moved axially, for example, in order to selectively open and/or close the pilot clutch. For this purpose, all that is required is a short axial movement path of the tie, and therefore the tie can be moved easily by a magnetic force generated by the actuation element. In an example embodiment, the tie is for this purpose formed by a ferromagnetic material, at least in a region situated opposite the actuation element.

In an example embodiment, with the aid of the tie, a friction element rotatably mounted on the tie can be moved in an axial direction to establish frictional coupling with the torque-introducing element, wherein the friction element is connected to the input ramp of the ramp system in a manner which prevents relative rotation but allows axial relative movement. When the friction element is moved axially by the tie, the friction element remains connected for conjoint rotation to the input ramp, e.g. by means of toothing, in order to be able to drive the ramp system in the event of a speed difference and frictional coupling. The friction element can be designed to co-rotate with the input ramp, while the tie is embodied, for example, in such a way that it can only be moved axially and does not co-rotate. The friction element can be rotatably supported on the tie by means of a bearing, for example, a deep groove ball bearing. The tie can act on a bearing ring of the bearing facing away from the friction element in order to move said bearing ring axially. This bearing ring can take along the other bearing ring, which is connected to the friction element, in an axial direction, with the result that the friction element is also simultaneously moved axially.

In an example embodiment, the output ramp of the ramp system is formed integrally with the pressure plate of the friction clutch. As a result, the output ramp can simultaneously form the pressure plate of the friction clutch, resulting in a correspondingly small installation space. An axial side of the output ramp facing the input ramp can be of beveled design in the circumferential direction to form the ramp system, while an axial side of the output ramp facing away from the input ramp can form a friction surface of the pressure plate for the friction clutch.

A rotor of an electric machine is, for example, connected to an output element of the friction clutch and/or to the torque-discharging element. As a result, the clutch system can be easily integrated as a hybrid module into a hybrid motor vehicle. The rotor can interact with a stator of the electric machine in order to introduce a torque into the torque-discharging element in the motor mode of the electric machine and to output a torque in the generator mode of the electric machine. For example, when driving in a purely electric way, a torque flow from the electric machine to the switched off motor vehicle engine can be interrupted with the aid of the pilot clutch. The electric energy which may be required to actuate the pilot clutch can be derived from the electric machine. To start the motor vehicle engine, it is furthermore possible to close the pilot clutch, thus enabling the electric machine to introduce a starting torque into the motor vehicle engine to start the motor vehicle engine.

The present disclosure furthermore relates to a powertrain for a motor vehicle having a torque-introducing element, for example, a drive shaft of the motor vehicle engine, a torque-discharging element, for example, a transmission input shaft of the motor vehicle transmission, a clutch system, which can be embodied and refined as described above, for transmitting a torque between the torque-introducing element and the torque-discharging element, and an electric machine for transmitting a torque between the electric machine and the torque-discharging element. For the changeover of operating modes in the overrun mode, all that is required is to use the pilot clutch to briefly exploit an existing speed difference between the torque-introducing element and the torque-discharging element to actuate the friction clutch, thus allowing easy and efficient adaptation of torque transmission in a powertrain of a hybrid motor vehicle to different driving strategies, especially when the hybrid motor vehicle is supposed to be driven in a purely electric way by the electric machine.

BRIEF DESCRIPTION OF THE DRAWINGS

Example embodiments are explained below with reference to the attached figures, in which.

DETAILED DESCRIPTION

Figure 1:
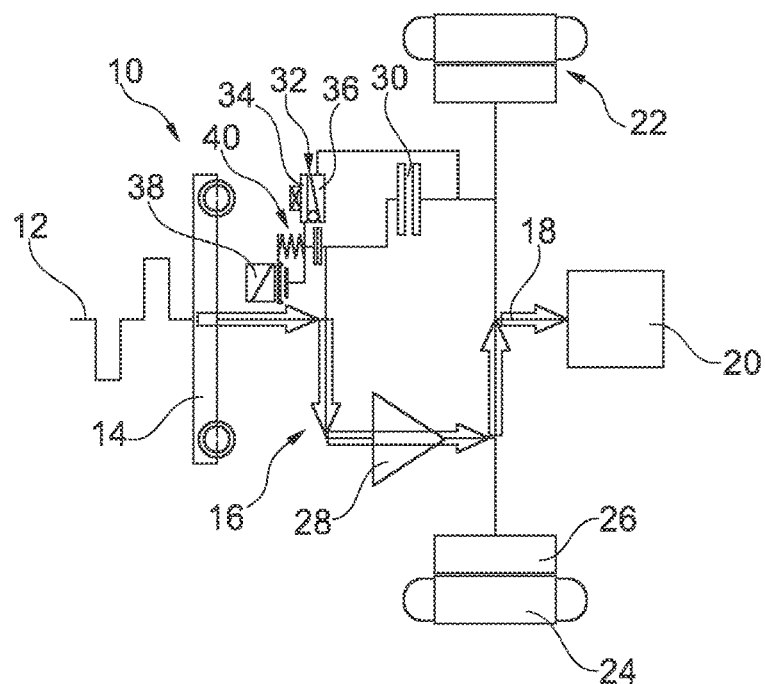
FIG. 1: shows a schematic diagrammatic illustration of a powertrain in the traction mode.

The powertrain 10 illustrated in FIG. 1 has a torque-introducing element 12 in the form of a drive shaft of a motor vehicle engine designed as a crankshaft, which can be coupled to a torque-discharging element 18 in the form of a transmission input shaft of a motor vehicle transmission 20 via a torsional vibration damper 14 in the form of a dual-mass flywheel and a clutch system 16. An electric machine 22 can also engage on the torque-discharging element 18 in order to exchange torque. For this purpose, the electric machine 22 has a stator 24, through which current can flow and which can interact with a rotor 26 coupled to the torque-discharging element 18. If appropriate, a separating clutch can be provided between the torque-introducing element 18 and the clutch system 16 and/or between the clutch system 16 and the torque-discharging element 18 in order to be able to select gears in the motor vehicle transmission 20 while the motor vehicle engine is running.

Figure 2:
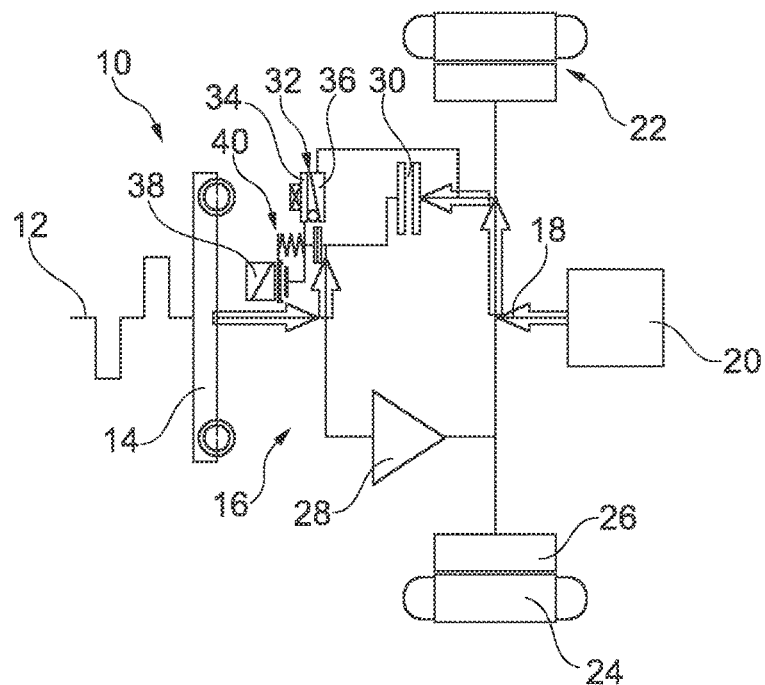
FIG. 2: shows a schematic diagrammatic illustration of the powertrain from FIG. 1 in the case of a changeover from the traction mode to the overrun mode.
Figure 3:
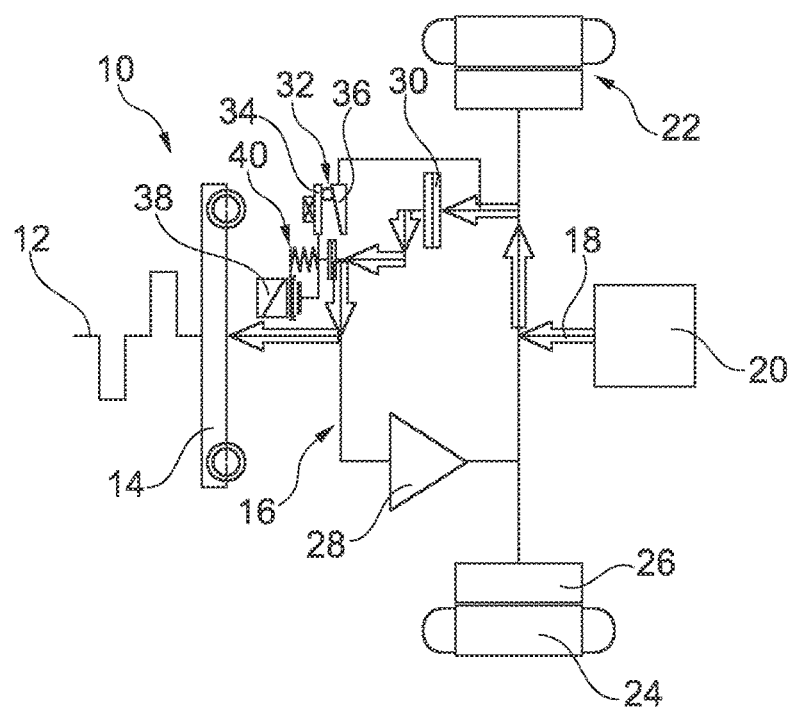
FIG. 3: shows a schematic diagrammatic illustration of the powertrain from FIG. 1 in the overrun mode.
Figure 4:
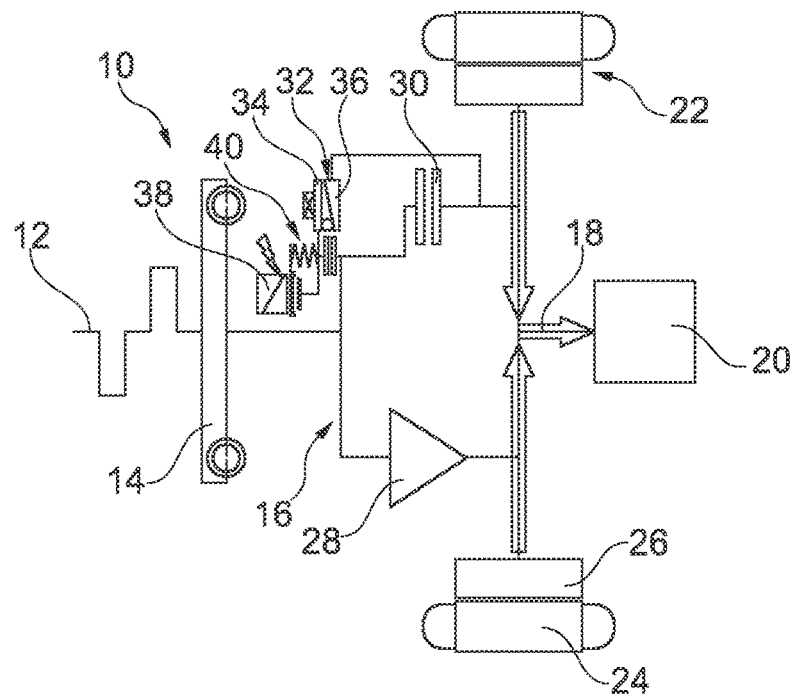
FIG. 4: shows a schematic diagrammatic illustration of the powertrain from FIG. 1 in the purely electric mode.

The clutch system 16 has a freewheel 28, by means of which the torque produced by the motor vehicle engine can be transmitted from the torque-introducing element 12 to the torque-discharging element 18 in the traction mode illustrated in FIG. 1. When there is a changeover from the traction mode to the overrun mode, as illustrated in FIG. 2, the torque-discharging element 18 can overtake the torque-introducing element 12, with the result that torque can no longer flow via the freewheel 28. In order to transmit torque from the torque-discharging element 18 to the torque-introducing element 12, e.g. to brake the motor vehicle with the aid of the mass moment of inertia of the motor vehicle engine, the torque can be transmitted via a friction clutch 30. To actuate the friction clutch 30, a ramp system 32 is provided, which can change its axial extent by rotation of an input ramp 34 relative to an output ramp 36. For this purpose, the output ramp 36 is coupled to the torque-discharging element 18, while the input ramp 34 can be coupled to the torque-introducing element 12 by means of a pilot clutch 40 that can be actuated with the aid of an actuation element 38. By means of the speed difference of the torque-introducing element 12 relative to the torque-discharging element 18 in the overrun mode, the input ramp 34 can be rotated relative to the output ramp 36 when the pilot clutch 40 is closed. The axial extent of the ramp system 32 can thereby be increased, as a result of which the friction clutch 30 is closed and a torque flow can take place from the torque-discharging element 18, via the clutch system 16, to the torque-introducing element 12, as illustrated in FIG. 3. It is also possible, in the overrun mode, to open the pilot clutch 40 with the aid of the actuation element 38 and to interrupt a torque flow to the torque-introducing element 12. This is recommended, for example, when the motor vehicle is to be driven in a purely electric manner by the electric machine 22, as illustrated in FIG. 4.

Figure 5:
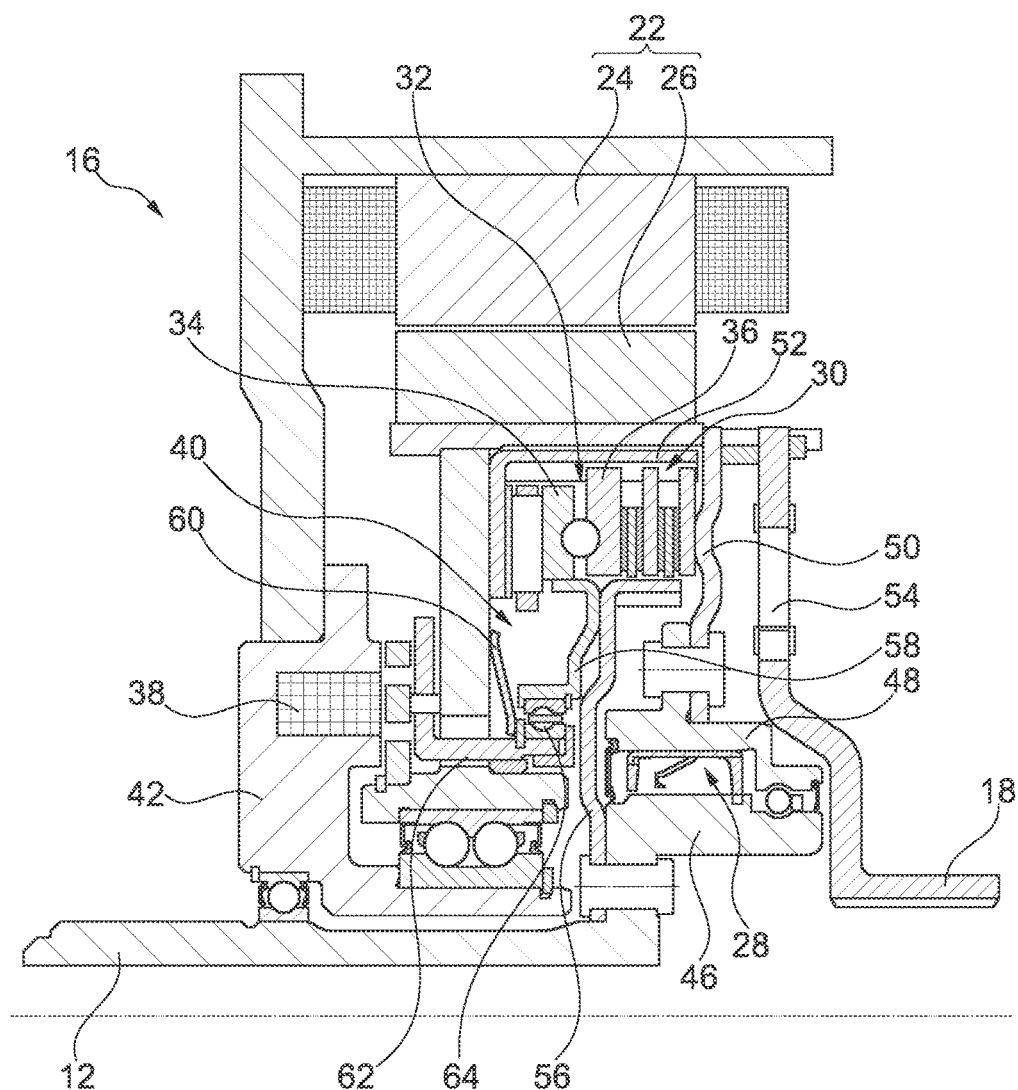
FIG. 5: shows a schematic sectional view of a clutch system for the powertrain from FIG. 1.

As illustrated in greater detail in FIG. 5, the clutch system 16 can have a fixed housing 42, to which the stator 24 of the electric machine 22 is fastened and on which the torque-introducing element 12 can be rotatably supported by means of a pilot bearing 44. The torque-introducing element 12 is connected to an inner ring 46 of the freewheel 28, said inner ring acting as an input ring. The freewheel 28 has an outer ring 48 acting as an output ring, which is riveted to a counterplate 50 of the friction clutch 30, which is designed as a multiplate clutch. The counterplate 50 is connected to an output element 52, designed as an outer plate carrier, which is, in turn, connected to the torque-discharging element 18 by a torque sensor 54 acting as an integrated radial offset compensator.

An input element 56, designed as an inner plate carrier, of the friction clutch 30, is furthermore riveted to the inner ring 46 of the freewheel 28. A friction element 58 of the pilot clutch 40 can act on the input element 56 in order to close the pilot clutch 40 by means of the friction pairing that is thereby established. The friction element 58 is connected to the input ramp 34 of the ramp system 32 in a manner which prevents relative rotation but allows axial movement in order to increase the axial extent of the ramp system 32 by virtue of a speed difference between the torque-introducing element 12 and the torque-discharging element 18. Here, the output ramp 36 coupled to the torque output element 18 can simultaneously act as a pressure plate of the friction clutch 30. The pilot clutch 40 is designed as "normally closed" and has a return spring 60, which presses the friction element 58 against the input element 56 with a corresponding contact force. For this purpose, the return spring 60 engages, for example, directly, on the friction element 58. In the embodiment illustrated, the return spring 60 engages on a tie 62 and/or on a ball bearing 64, by means of which the friction element 58 is rotatably mounted on the tie 62. The tie 62 can be produced from a ferromagnetic material and can be magnetically attracted by the actuation element 38 to cancel the friction pairing between the friction element 58 and the input element 56 against the spring force of the return spring 60 and thereby open the pilot clutch 40. When the pilot clutch 40 is open, a spring force applied by the torque sensor 54, for example, can move the friction clutch 30 automatically into an open position.

LIST OF REFERENCE SIGNS 10 powertrain
12 torque-introducing element
14 torsional vibration damper
16 clutch system
18 torque-discharging element
20 motor vehicle transmission
22 electric machine
24 stator
26 rotor
28 freewheel
30 friction clutch
32 ramp system
34 input ramp
36 output ramp
38 actuation element
40 pilot clutch
42 housing
44 pilot bearing
46 inner ring
48 outer ring
50 counterplate
52 output element
54 torque sensor
56 input element
58 friction element
60 return spring
62 tie
64 ball bearing

The invention claimed is:

1. A clutch system comprising:
a friction clutch configured for transmitting a torque between a torque-introducing element and a torque-discharging element, the friction clutch comprising:
an output element configured as an output plate carrier; and
an axially fixed counterplate; and
a ramp system comprising:
an input ramp;
an output ramp rotatable relative to the input ramp to change an axial extent of the ramp system;
a pilot clutch configured for initiating rotation of the input ramp relative to the output ramp when there is a differential speed between the torque-introducing element and the torque-discharging element;
an actuation element configured for actuating the pilot clutch; and,
a freewheel arranged in a torque path in parallel with the friction clutch,
wherein the freewheel comprises:
an input ring coupled to the torque-introducing element; and
an output ring coupled to the torque-discharging element and connected to the output element via the counterplate; and
wherein the freewheel is arranged to:
transmit a torque flow from the torque-introducing element to the torque-discharging element; and,
interrupt a torque flow from the torque-discharging element to the torque-introducing element.

2. The clutch system of claim 1, wherein:
the friction clutch is a multiplate clutch;
the torque-introducing element is a drive shaft of a motor vehicle engine; and,
the torque-discharging element is a transmission input shaft of a motor vehicle transmission.

3. The clutch system of claim 1, wherein:
closing the pilot clutch frictionally couples the pilot clutch to the input ring.

4. The clutch system of claim 3 wherein,
the friction clutch includes an input plate carrier; and,
when closed, the pilot clutch is coupled to the input ring via the input plate carrier.

5. The clutch system of claim 1 wherein:
the output element of the friction clutch includes an integrated radial offset compensator.

6. The clutch system of claim 5 wherein the radial offset compensator is a torque sensor.

7. The clutch system of claim 1 wherein:
the torque-discharging element includes an integrated radial offset compensator.

8. The clutch system of claim 7 wherein the radial offset compensator is a torque sensor.

9. The clutch system of claim 1 wherein the pilot clutch includes a return spring for positioning the pilot clutch in an initial closed position.

10. The clutch system of claim 1 wherein:
the pilot clutch comprises a tie; and,
the tie can be moved axially by the actuation element for opening or closing the pilot clutch.

11. The clutch system of claim 10 wherein the tie is moved magnetically by the actuation element.

12. The clutch system of claim 10 further comprising:
a friction element rotatably mounted on the tie and connected to the input ramp in a manner rotatably fixed and axially moveable, wherein:
the friction element is axially moveable to frictionally couple with the torque-introducing element.

13. The clutch system of claim 1 wherein the output ramp is formed integrally with a pressure plate of the friction clutch.

14. The clutch system of claim 1 wherein a rotor of an electric machine is connected to the torque-discharging element.

15. The clutch system of claim 1 wherein the friction clutch comprises an output element and a rotor of an electric machine is connected to the friction clutch output element.

16. A powertrain for a motor vehicle comprising:
the clutch system of claim 1;
the torque-introducing element;
the torque-discharging element; and,
an electric machine.

17. A powertrain for a motor vehicle comprising:
the clutch system of claim 4;
the torque-introducing element;
the torque-discharging element; and,
an electric machine.

18. A powertrain for a motor vehicle comprising:
the clutch system of claim 1;
the torque-introducing element;
the torque-discharging element; and,
an electric machine.

19. A powertrain for a motor vehicle comprising:
the clutch system of claim 12;
the torque-introducing element;
the torque-discharging element; and,
an electric machine.

20. A clutch system comprising:
a friction clutch configured to transmit a torque between a torque-introducing element and a torque-discharging element, the friction clutch including an input plate carrier; and
a ramp system comprising:
an input ramp;
an output ramp rotatable relative to the input ramp to change an axial extent of the ramp system;
a pilot clutch configured to initiate rotation of the input ramp relative to the output ramp when there is a differential speed between the torque-introducing element and the torque-discharging element;
an actuation element configured to actuate the pilot clutch; and
a freewheel arranged in a torque path in parallel with the friction clutch, wherein the freewheel comprises an input ring coupled to the torque-introducing element and an output ring coupled to the torque-discharging element, wherein closing the pilot clutch frictionally couples the pilot clutch to the input ring via the input plate carrier, and wherein the freewheel is arranged to:
transmit a torque flow from the torque-introducing element to the torque-discharging element; and
interrupt a torque flow from the torque-discharging element to the torque-introducing element.

* * * * *